(No Model.) 3 Sheets—Sheet 1.

G. MOCK.
CAR COUPLING.

No. 426,415. Patented Apr. 22, 1890.

WITNESSES
Frank Pardon
W. H. Meriwether

INVENTOR
George Mock
per
R. M. Kelly
Attorney (No Model.) 3 Sheets—Sheet 2.

G. MOCK.
CAR COUPLING.

No. 426,415. Patented Apr. 22, 1890.

WITNESSES
Frank Pardon
W. A. Meriwether

INVENTOR
George Mock
per R. M. Kelly
attorney

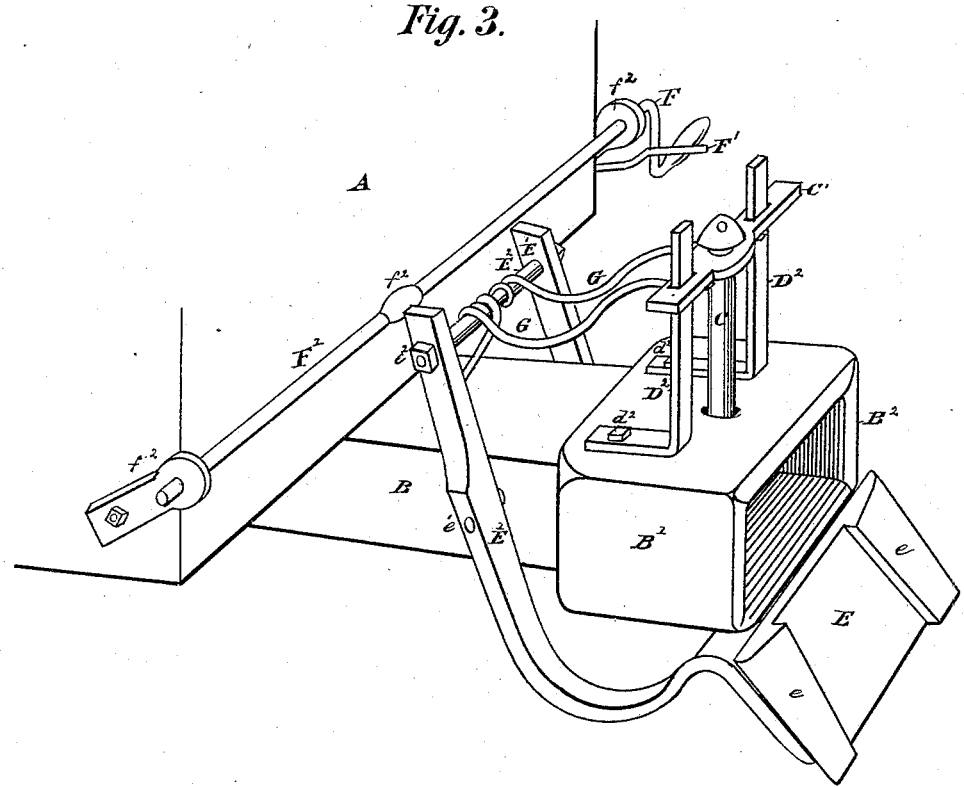

UNITED STATES PATENT OFFICE.

GEORGE MOCK, OF SPRINGFIELD, KENTUCKY, ASSIGNOR OF ONE-FOURTH TO JOHN W. LEWIS, OF SAME PLACE.

CAR-COUPLING.

SPECIFICATION forming part of Letters Patent No. 426,415, dated April 22, 1890.

Application filed December 16, 1889. Serial No. 333,855. (No model.)

*To all whom it may concern:*

Be it known that I, GEORGE MOCK, a citizen of the United States, residing at Springfield, in the county of Washington and State of Kentucky, have invented certain new and useful Improvements in Automatic Car-Coupling Attachments; and I do hereby declare the following to be a full, clear, and exact description of the invention, such as will enable others skilled in the art to which it appertains to make and use the same.

My invention relates to automatic couplings for railroad-cars, and is intended to provide a cheap and convenient attachment which can be easily applied to ordinary draw-heads and by means of which automatic coupling can be effected with the link and pin in general use. I accomplish this by the means illustrated in the accompanying drawings, which are in three sheets and throughout which similar letters refer to similar parts.

Figure 1:
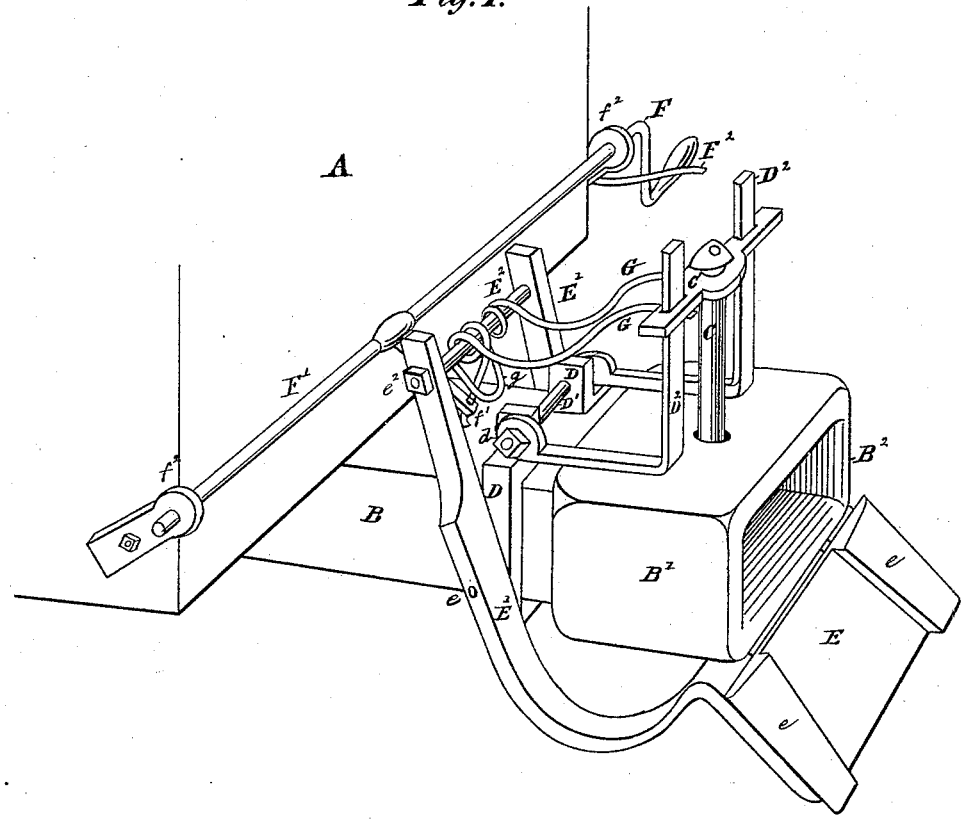
Figure 2:
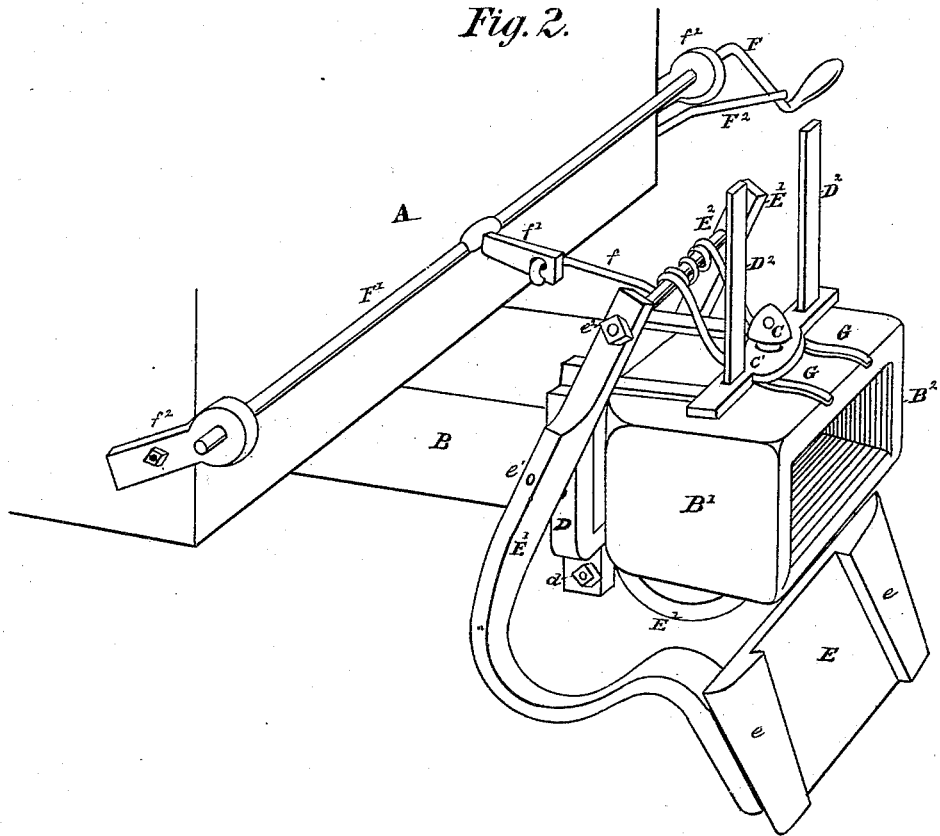

Figure 1 is a perspective view of part of the end of a freight-car furnished with a draw-head of the pattern generally used with the link-and-pin coupling, to which my coupling device is attached in position to couple automatically. Fig. 2 is a similar view showing my coupling device in the position it will assume when the coupling is complete. Fig. 3 is a similar view showing a modified form of my coupling device in position to couple.

A is a freight-car; B, a draw-head; B', the buffer of the draw-head; B², its mouth.

My coupling attachment consists of a draw-band D, adapted to be held firmly around the neck of the draw-head by tightening-rods D' and nuts $d$ above and below the draw-head, guiding-standards D², held firmly to the draw-band by the nuts $d$ on the ends of the tightening-rod above the draw-head, curved arms E' on each side of the draw-head, pivoted to the draw-band, as at $e'$, so as to swing freely, and held together at their upper ends by the bolt or bar E² and nuts $e^2$, and curved at their lower ends, so as to hold the guiding plate or apron E, having guiding-flanges $e$, in position to throw a link striking it into the mouth of the draw-head, curved fingers G G, attached to the connecting-bolt E², on which fingers rests a plate C', slotted in the middle to receive the coupling-pin C, and slotted near each end, so as to fit over the standards D² and move easily up and down them, and a rod $f$, connecting the bolt E² to a lever-arm $f'$, moved by a crank on the car A. As shown in the drawings, and as I prefer, the fingers G G are formed by a strong wire rod bent round the connecting-bolt E², so as to form a loop $g$ before they are stretched out to support the plate C'. This loop $g$ furnishes a leverage for $f$, which is a strong wire rod bent round the bolt E² and then fastened through the lever-arm $f'$. The arm $f'$ projects rigidly from a rod F', passing across the end of the car A and having bearings in the brackets $f^2$ on each side of the car, and which may be turned by the crank and handle F.

By turning the crank F so as to throw the arm $f'$ almost perpendicularly downward the upper ends of the swinging arms E' are brought back toward the car, the fingers G lift the slotted plate C', guided by the standards D², and the coupling-pin C, supported on the plate by its flanged head to a height sufficient to leave the mouth of the draw-head entirely free for the entrance of the link, and the guiding-plate E is at the same time put at such an angle to the mouth of the draw-head as will throw a link striking it directly into the mouth of the draw-head under the pin. A spring-catch F² on the side of the car retains the handle F and holds the parts in this position of readiness.

When a car with the link projecting from its draw-head in order for coupling, whether provided with my attachment or not, approaches a car provided with my appliance and prepared as described, the link on the approaching car will first strike the apron E and be directed by it and by its flanges $e$ into the mouth of the draw-head, and the buffer of the approaching draw-head will then strike E a blow, which will release the handle F from the retaining-spring F², and the plate will drop by its own weight out of the way below the draw-head, throwing the swinging arms E', to which it is attached, forward, and dropping the fingers G, so that the coupling-pin supported by them will fall directly down into the mouth of the draw-head, engaging the coupling-link at the moment of its entrance and completing the coupling. No matter how hard a blow the advancing car may strike the plate E it will receive no damage, because it will offer no resistance. I do not limit myself to any particular mode of moving the arms E' or of attaching the fingers G to the connecting-bolt $E^2$.

When cars provided with my appliance are to be uncoupled, all that is necessary is to move the handle F so as to lift the pin C.

A great advantage of my invention is that it can be attached expeditiously to cars furnished with the ordinary draw-heads and the ordinary link-and-pin coupling without going to expense in making changes in the draw-heads.

If desired, the draw-band D can be dispensed with and the swinging arms E' be pivoted to the draw-head, as shown in Fig. 3, and the standards $D^2$ can be riveted to the top of the draw-head, as shown in Fig. 3, instead of being bolted to the draw-band, as shown in Figs. 1 and 2. In practice, however, I prefer the method first described, as in that case the whole coupling appliance can be prepared separately and attached to the car in a few minutes.

Having thus described my invention, what I claim as new, and desire to secure by Letters Patent of the United States, is—

1. In an automatic car-coupling, the combination, with the draw-head B, of the swinging arms E', tied together at their upper ends by the bolt $E^2$ and the screw-nuts $e^2$ and at their lower ends by the plate E, having the guide-flanges $e$, substantially as set forth, and for the purpose specified.

2. In an automatic car-coupling, the combination, with the draw-head B, of the swinging arms E', the plate E, the tying-bolt $E^2$, the fingers G, the slotted plate C', the pin C, and the guiding-standards $D^2$, substantially as set forth, and for the purpose specified.

3. In an automatic car-coupling, the combination, with the draw-head B, of the swinging arms E', pivoted to the draw-head and fastened together at their upper ends by the bolt $E^2$ and at their lower ends by the plate E, the fingers G, attached to the tying-bolt $E^2$, the slotted plate C', resting on the fingers G, the pin C, the guiding-standards $D^2$, riveted to the draw-head, and mechanism for operating the swinging arms E', and the fingers G to lift the pin C and throw the plate E forward below the mouth of the draw-head, substantially as set forth, and for the purpose specified.

4. In an automatic car-coupler, the combination, with a draw-head B, of the draw-band D, made in two parts, held together at the top and bottom by the rods D' and the nuts $d$ and adapted to fit around the neck of a draw-head, and the standards $D^2$, attached to the draw-band by the nuts $d$, substantially as set forth.

5. In an automatic car-coupling, the combination, with the draw-band D, made in two parts, held together at top and bottom by the bolts D' and the nuts $d$ and adapted to fit around the neck of a draw-head, and the standards $D^2$, held to the draw-band by the nuts $d$, of the curved swinging arms E', pivoted to the draw-band on each side and held together at the upper end by the bolt $E^2$ and the nuts $e^2$ and at the lower end by the plate E, having guiding-flanges $e$, the fingers G, attached firmly to the bolt $E^2$, and the slotted plate C', adapted to rest on the fingers G and be guided by the standards $D^2$, substantially as described, and for the purposes specified.

6. In a car-coupling, the combination, with the car A and the draw-head B, the draw-band D, adapted to fit around the neck of the draw-head and having attached to it the standards $D^2$, and the swinging arms E', fastened together at their upper ends by the bolt $E^2$, with the fingers G, rigidly attached to it, and at their lower ends by the plate E, the slotted plate C', and the pin C, of the loop $g$, the rigid arm $f'$, the rod $f$, connecting the bolt $E^2$ with the arm $f'$, and mechanism for moving the arm $f'$, substantially as set forth, and for the purpose specified.

7. In an automatic coupling for railroad-cars, the combination, with a coupling apparatus consisting of a draw-band D, adapted to be fitted around the neck of a draw-head by bolts and nuts, swinging arms E', pivoted on each side of the draw-band and united at their upper ends by the bolt $E^2$, to which are attached rigidly the fingers G, and at their lower ends by the plate or apron E, having the guiding-flanges $e$, and the slotted plate C', resting on the fingers G, adapted to receive the guiding-standards $D^2$ and to support the pin C, of mechanism for operating the coupling apparatus without going between the cars, consisting of the rod F', having a rigid arm $f'$ projecting from its middle, movable by a crank and handle F, and having bearings in brackets $f^2$, attached to a car on each side, the connecting-rod $f$, and the handle-retaining spring $F^2$, substantially as set forth, and for the purpose specified.

In testimony whereof I affix my signature in presence of two witnesses.

GEORGE MOCK.

Witnesses:
 REUBEN MOCK,
 C. C. TAYLOR.